Sept. 5, 1967  D. R. PETERS  3,339,401
BRAKE BLEED AND FILL MACHINE
Filed April 1, 1965  2 Sheets-Sheet 1

INVENTOR.
Donald R. Peters
BY
Donald P. Selverski
HIS ATTORNEY

INVENTOR.
Donald R. Peters
BY
HIS ATTORNEY

United States Patent Office 3,339,401
Patented Sept. 5, 1967

3,339,401
BRAKE BLEED AND FILL MACHINE
Donald R. Peters, Birmingham, Mich., assignor to General Motors Corporation, Detroit, Mich., a corporation of Delaware
Filed Apr. 1, 1965, Ser. No. 444,722
5 Claims. (Cl. 73—40.5)

ABSTRACT OF THE DISCLOSURE

A device for filling, bleeding and leak testing hydraulic brake systems including coupling means to alternatively connect the brake system to a vacuum source and then to a brake fluid supply source under positive pressure. The vacuum bleeds the air from the system. A fluid flow responsive device is placed in the supply system to sense fluid flow resulting from a leak in the system.

This invention relates to a mechanism and a process for automatically filling brake lines with brake fluid and more particularly to apparatus and a process for evacuating brake lines and filling the evacuated brake lines with hydraulic fluid under pressure while monitoring the leak resistance of the brake lines.

In the construction of automobiles, it is necessary to install hydraulic brake lines to the vehicle brakes on an assembly line. This involves filling brake lines with brake fluid which lines are substantially free of air and determining the leak resistance of the brake lines while the vehicle is in motion on the assembly line. Present methods for bringing this about involve the use of several men individually filling and bleeding the brake lines at the wheel cylinders in order to insure that the brake lines, when attached to the master cylinder sometime later during the assembly process, are fluid-tight and devoid of entrapped air. In the interest of high product reliability and in the interest of economy, it becomes desirable to check the brake lines under pressure before further stages of assembly of the vehicle are accomplished. It is also necessary that the brake lines when filled are substantially free from entrapped air which condition, if present, would later result in unreliable brakes.

It is an object of the present invention to provide an automatic means for filling and bleeding vehicle brake lines simultaneously and a method for carrying out this object.

It is another object of the present invention to provide an improved means for evacuating trapped air from brake lines and later testing the brake lines under fluid pressure to determine their leak resistance.

It is yet another object of the present invention to provide an improved brake bleed and fill machine which is adapted to bleed and fill vehicle brake lines from a single point in the brake system.

It is a further object of the present invention to carry out the aforementioned objects of this invention while the vehicle is in motion during the assembly thereof.

Further objects and advantages of the present invention will be apparent from the following description, reference being had to the accompanying drawings wherein a preferred embodiment of the present invention is clearly shown.

Figures 2, 3:
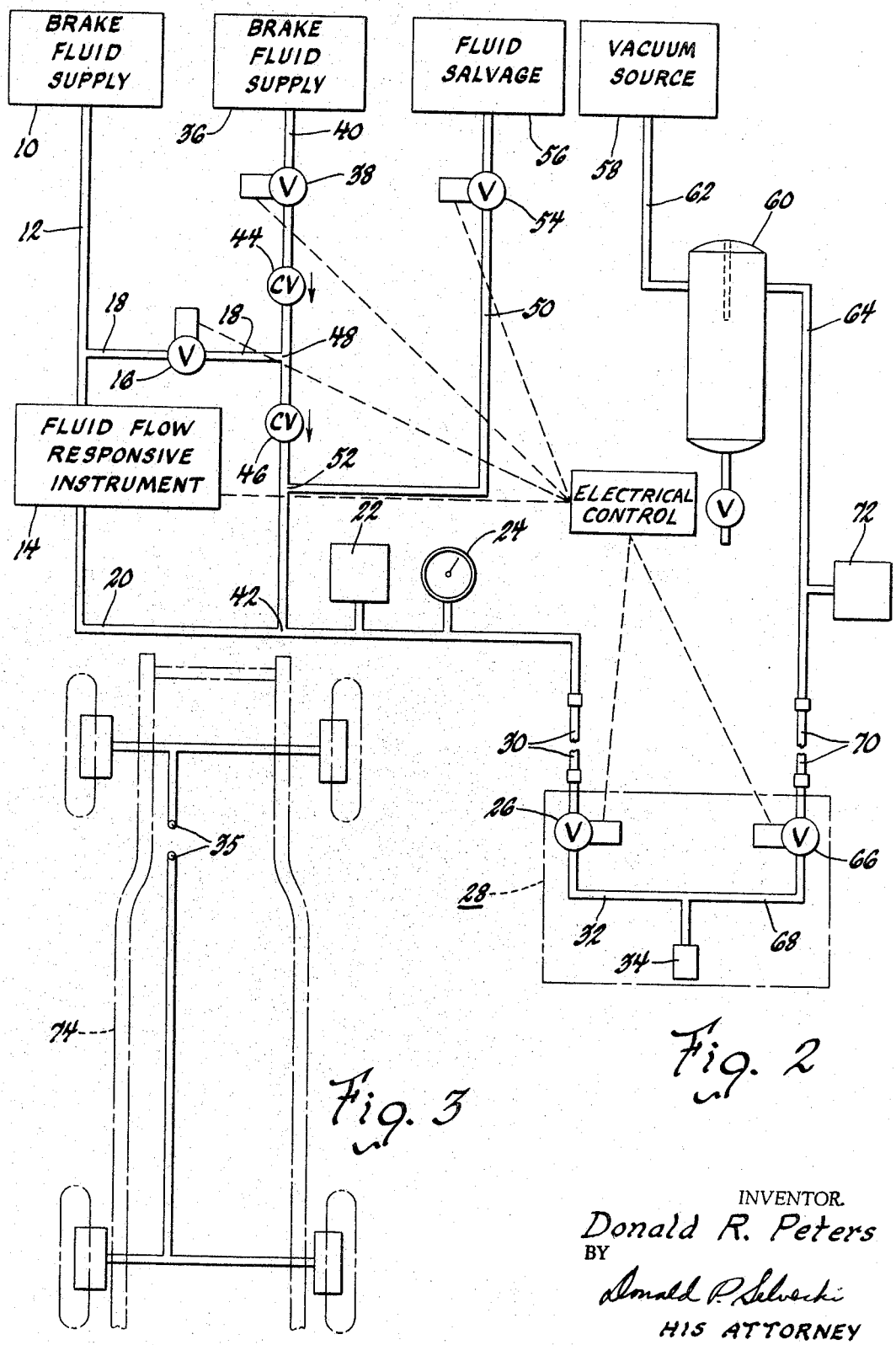
FIGURE 2 is a schematic illustration of a typical pressure system used to carry out the objects of the present invention.
FIGURE 3 is a diagrammatic illustration of a vehicle brake system wherein the front brake lines and rear brake lines are simultaneously bled and filled.

Referring to FIGURE 2, a brake fluid supply 10 is provided, said brake fluid supply preferably taking the form of a pressurized reservoir. The brake fluid supply 10, including a pressure intensifier, not shown, would be typically pressurizable to approximately 2000 p.s.i. It is understood that this figure is illustrative alone and any degree of pressurization is usable consistent with a particular system as designed. A line 12 from the brake fluid supply 10 supplies fluid to a fluid flow responsive instrument 14 and also communicates the pressurized fluid to a pressurizing or by-pass valve 16 through line 18. The fluid flow responsive instrument 14 can be any type of device responsive to small amounts of fluid flow that is adapted to provide a signal when flow therethrough exceeds certain predetermined limits. The predetermined limits would be determined by the amount of allowable fluid leakage in a given system under designed operating pressures. Line 20 from the fluid flow responsive instrument 14 communicates fluid to a pressure switch 22 and a pressure gauge 24 and terminates in a valve 26 contained within a coupler 28. Section 30 of line 20 would preferably be flexible in order to allow the coupling device 28 to be portable. Line 32 within the coupling device 28 terminates in a brake line coupler 34 which is adapted to sealingly engage brake line ends 35, better seen in FIGURE 3.

It is understood that the coupler 34 is adapted to engage a single brake line end 35 in a brake system having a single master cylinder or is easily constructed to engage more than one brake end in a system utilizing multiple master cylinders.

A second brake fluid supply 36 is capable of producing at least 70 pounds of pressure at coupler 34. A fill valve 38 is preferably electrically controlled and is in fluid communication with the first brake fluid supply 10. Valve 38 is disposed in line 40, ultimately communicating fluid to line 20 at juncture 42. Check valves 44 and 46 are disposed in line 40 on either side of juncture 48 representing the connection between lines 40 and 18.

Line 50 is in fluid communication with line 40 at juncture 52 and also communicates with vent valve 54. Vent valve 54 controls fluid flow through line 50 to fluid salvage 56. Fluid salvage 56 can be a reservoir for brake fluid arranged to provide a source for fluid for first brake fluid supply 10 and second brake fluid supply 36.

Vacuum source 58 communicates with a fluid trap 60 through line 62 which is arranged to prevent the passage of brake fluid from line 64 to line 62. Line 64 communicates with a vacuum control valve 66 contained within coupling device 28. Valve 66 communicates with coupler 34 through line 68. Section 70 of line 64 is flexible in its preferred form to adapt the coupling device 28 to be portable. Vacuum sensor 72 communicates with line 64 to provide vacuum control and an indication of vacuum condition within line 64. Sensor 72 would preferably include a vacuum control valve and a vacuum indicator to illustrate the pressure condition of vacuum lines 64, 70 and 68.

Figure 1:
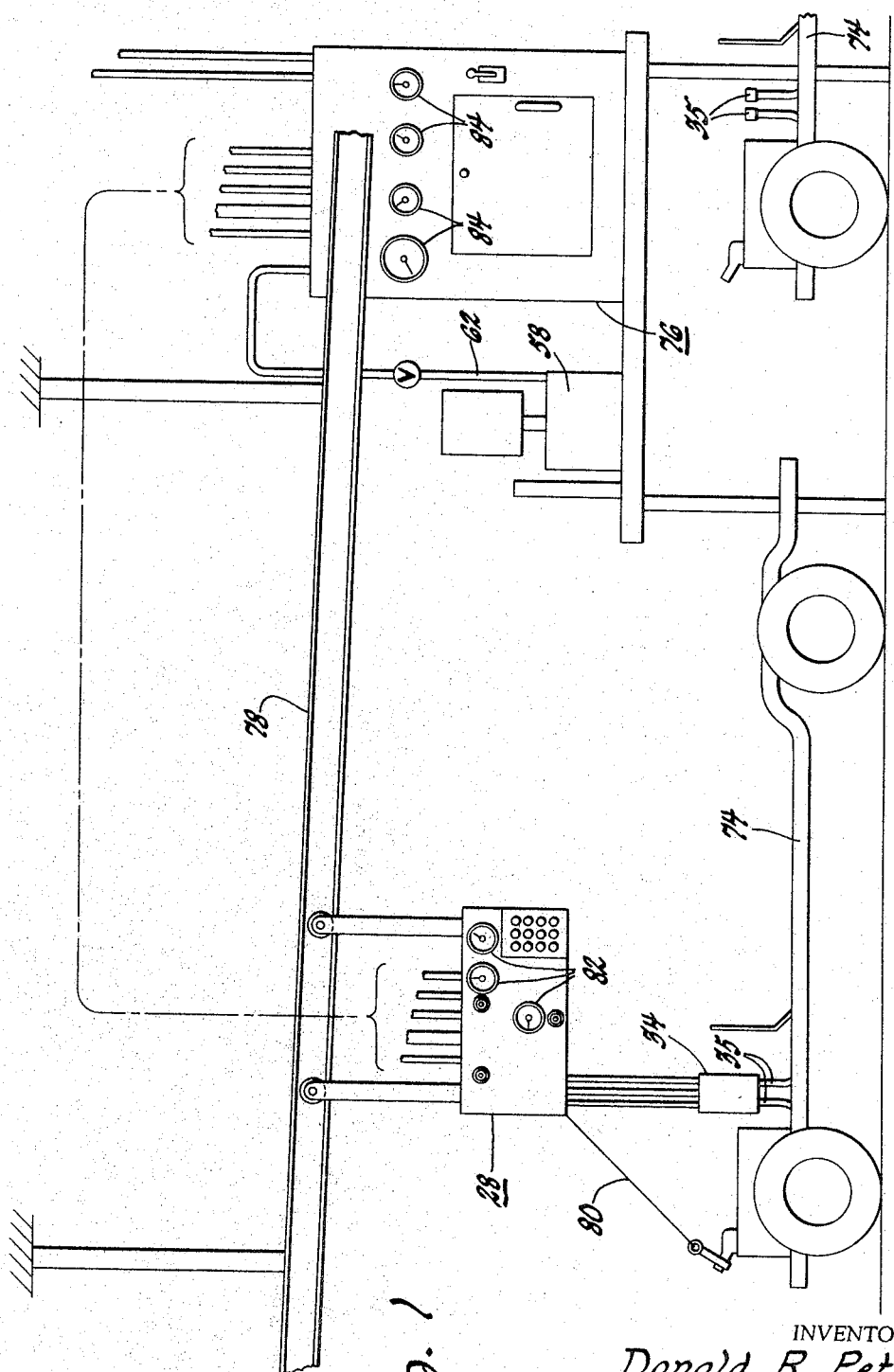
FIGURE 1 is a diagrammatic representation of the present invention showing the stationary and movable portions of the invention in their operative environment.

Referring to FIGURE 1, a diagrammatic illustration of a vehicle assembly line is shown wherein vehicle bodies 74 are moved past relatively fixed brake bleed and fill machine 76. Appropriate electrical and fluid connections are made between machine 76 and coupling device 28. Coupling device 28 is preferably suspended from an overhead beam 78 inclined away from the brake bleed and fill machine 76 and is movably carried thereby in any well-known manner. Tow line 80 carried by coupling device 28 is attachable to vehicle body 74 at any convenient point and serves to draw coupling device 28 along an assembly line with vehicle body 74. The inclination of beam 78 allows the coupling device 28 to roll back toward a position of rest by the force of gravity when tow line 80 is detached from vehicle body 74 after a brake bleed and fill cycle has been completed on the vehicle brake lines.

It is understood that the brake bleed and fill machine is preferably electrically controlled by electrical devices well known in the art and utilizes pressure operated and electrically operated valves of well-known design. Guages 82 shown on coupling device 28 could correspond to gauge 24 and sensor 72 if desirable in a given installation or could refer to gauges utilized in the monitoring of different pressures in the system as desired in a given installation. Likewise, gauges 84 shown on brake bleed and fill machine 76 are illustrated only by example to indicate typical mounting positions for gauges suitable for monitoring power or pressures in the described system when desired in a given installation. The exact location of the valves and gauges, illustrated in FIGURE 2, is limited only by the area of vision of the one utilizing associated equipment so as to make it function acceptably. The intent of the positions shown of the valving and control apparatus in FIGURE 2 is meant to indicate only relative positions in the system with respect to fluid communication and is not meant to set forth any positions of a patentable nature other than as a given valve or control functions in the system.

In operation, coupler 34 which can be adapted to engage one or more ends of brake lines, is sealingly coupled to the ends of brake lines 35 as seen in FIGURE 3. Appropriate electrical control mechanism would be engaged to start the cycling of the mechanism. Valve 66 in the coupling device 28 would be opened and vacuum from source 58 applied on the brake lines to be checked. Evacuation of the system would be effected at a minimum of two millimeters of mercury of negative pressure. The maximum amount of negative pressure would be determined by the extent of evacuation desired in a given system. After the brake lines are evacuated to the desired pressure, vacuum sensor 72 is adapted to signal an "accept" or "reject" indication. A "reject" indication would prevent further cycling of the apparatus and apprise the machine operator of a brake system having a tendency to leak under a negative pressure. At this point, repairs could be effected on the malfunctioning brake system or the system marked for future maintenance.

If sensor 72 indicates "accept" the cycling will automatically continue. It is understood that the "accept" and "reject" indication can be visual as well as being provided by electrically cycling apparatus within the system. If sensor 72 indicates that the brake lines will hold the predetermined vacuum, vacuum valve 66 is automatically closed, thereby trapping the negative pressure in the brake lines.

After valve 66 closes, fill valves 26 and 38 open allowing brake fluid to flow through line 32 through coupler 34 into the brake lines. It is understood that the vacuum is sufficient to draw fluid into the brake lines but additional pressure is provided from the brake fluid supply 36 of approximately 70 p.s.i. This pressure value, within design limits, is not critical but is meant to subject the brake lines to a certain fill pressure. Gauge 24 in conjunction with switch 22 can be arranged to check the brake lines under the relatively low fill pressure. If the pressure is acceptable, determined by the holding of pressure for a predetermined period of time, the pressurizing or bypass valve 16 is opened and the pressure already present in the brake lines is intensified by the high pressure brake fluid supply 10 up to 1000 to 2000 p.s.i. An electrical timing mechanism will determine the period of time that the brake lines are subjected to this intensified pressure. A fluid flow responsive instrument is likewise exposed to this high pressure and is monitored either visually or electrically or both to determine amount of flow through instrument 14. It is obvious that, if a leak exists in the brake lines, pressure will drop in the system and more flow will be required in order to maintain the test pressure. A fluid flow responsive instrument can be arranged to give a visual indication of excessive flow or to provide a "reject" signal.

If an "accept" signal is received from instrument 14, cycling continues by the closing of the pressurizing or by-pass valve and an opening of vent valve 54, thereby bleeding off the pressure to the fluid salvage reservoir 56. In sequence, fill valve 26 closes along with fill valve 38, thereby allowing coupler 34 to be disengaged from the ends 35 of the brake lines.

Referring to FIGURE 1, tow line 80 is disengaged from vehicle body 74 after coupler 34 is disengaged and coupling device 28 moves by gravity down beam 78 to a position of rest near the brake bleed and fill machine 76.

It should be emphasized that, while the system shown in FIGURE 1 is meant to be a working arrangement of the system shown in FIGURE 2, the visual representation of FIGURE 1 is illustrative alone and sets forth only a typical operative environment and not an operative environment to which the subject invention is limited. For example, the gravity return of coupling device 28 along beam 78 is an expedient known in the art but is a very effective method of effecting a return of coupling device 28 to an original position on an assembly line. The subject invention is thereby adapted for use on a brake system while the entire system is in motion and is adapted so that the system works equally as well if the brake lines to be tested remain stationary.

It is likewise understood that the invention as described herein pertains to novel apparatus for carrying out a novel process. The apparatus combines different units in a novel manner to bring about the automatic evacuation and filling of a closed system utilizing only one opening into that closed system. Also disclosed is a novel process which allows one person to expediently and controllably bleed and fill a vehicle brake system utilizing only one inlet thereinto.

The utility of the subject apparatus can be extended into any environment where it is necessary to completely displace air disposed therein with a fluid, said system being necessarily pressure-tight after filling. The brake system of a vehicle is such a typical environment. The process of bleeding and filling before pressure testing a closed system is particularly useful in the original servicing of brake systems. It is obvious, however, that the process described is also utilizable in other environments, for example, filling hydraulically operated apparatus with fluid where the absence of air is necessary to the efficient operation thereof.

While the embodiment of the present invention, as herein disclosed, constitutes a preferred form, it is to be understood that other forms might be adopted.

What is claimed is as follows:

1. Brake bleed and fill mechanism for vehicle brake lines comprising: coupler means for attaching to brake lines of a vehicle thereby simultaneously isolating all vehicle brake lines from atmospheric pressure; vacuum means in fluid communication with vehicle brake lines through said coupler means and being adapted to selectively and sequentially apply a negative pressure to vehicle brake lines; fluid pressure means in fluid communication with vehicle brake lines through said coupler means and adapted to sequentially fill vehicle brake lines with fluid and pressurize the fluid therein to determine the leak resistance of the brake lines; electrical means for sequencing the operation of said vacuum means and said fluid pressure means; valve means electrically operated and communicating with said vacuum means and said fluid pressure means to selectively apply said vacuum and fluid pressure as required; and fluid flow responsive means communicating with said fluid pressure means for providing an indication of fluid retention capability of the brake lines.

2. Brake bleed and fill mechanism for vehicle brakes comprising: portable coupling means adapted to engage the open ends of several brake lines; vacuum means including means for communicating a negative pressure to said portable coupling means; fluid pressure means adapted to communicate brake fluid under positive pressure to said portable coupling means; electrical means for controlling the sequence and duration of application of negative and positive pressure to the brake lines through said portable coupling means; valve means disposed in said vacuum means and in said fluid pressure means and controllable by said electrical means to sequentially permit the application of negative and positive pressure to the brake lines thereby bleeding the brake lines of air and filling the brake lines with fluid; and flow responsive means in fluid communication with said fluid pressure means to indicate a fluid tight condition of brake lines.

3. Brake bleed and fill mechanism for vehicle brakes comprising: coupling means having a plurality of inputs and a plurality of outputs, said outputs being sealingly engageable with a plurality of brake lines; vacuum means sequentially operable and engaging at least one of the inlets to said coupling means thereby selectively communicating a negative pressure to the brake lines; fluid pressure means engaging at least one other of said plurality of inputs to said coupling means thereby selectively communicating fluid under pressure to the brake lines; electrical means including electrical sequencing means and electrical timing means; valve means disposed in said vacuum means and in said fluid pressure means and operable by said electrical means to selectively and sequentially apply a negative pressure to the brake lines causing an evacuation thereof and later filling the evxacuated brake lines with fluid under pressure, said valve means being sequentially operated to hold the fluid under pressure in the brake lines for a predetermined period of time; and fluid flow responsive means for monitoring the fluid under pressure in the brake lines and providing an indication of the capability of the brake lines to retain fluid under pressure.

4. The brake bleed and fill mechanism according to claim 3 wherein said coupling means is movably mounted and connected to said vacuum means and said fluid pressure means by flexible lines thereby adapting said coupling means to continually engage a vehicle brake line during movement of the vehicle on an assembly line.

5. The brake bleed and fill mechanism according to claim 3 wherein said electrical means includes timing means for controlling the duration of application of negative and positive pressures to the brake lines and sequencing means for selectively operating said valve means to first apply a negative pressure from said vacuum means to the brake lines through said coupling means to evacuate the brake lines, later closing said valve means to vacuum means thereby holding vacuum for a predetermined period in the brake lines, to secondly open valve means from said fluid pressure means to fill the previously evacuated brake lines with fluid under pressure, later closing valve means from said fluid pressure means to hold fluid under pressure in the brake lines for a predetermined period, said fluid flow responsive means being adapted to give a positive or negative indication of the ability of the brake lines to hold fluid under pressure without leaking.

References Cited
UNITED STATES PATENTS

| | | | |
|---|---|---|---|
| 2,644,548 | 7/1953 | Schiemann | 188—152.14 |
| 2,645,314 | 7/1953 | Lackinger | 188—152.1 |
| 3,175,389 | 3/1965 | Workbois et al. | 73—39 |
| 3,221,539 | 2/1965 | Evans et al. | 73—49.2 X |

LOUIS R. PRINCE, *Primary Examiner.*

J. NOLTON, *Assistant Examiner.*